United States Patent
Violi et al.

(10) Patent No.: US 9,686,611 B2
(45) Date of Patent: Jun. 20, 2017

(54) ENGINE SOUND ENHANCEMENT SYSTEM OF A VEHICLE

(71) Applicant: ASK INDUSTRIES SOCIETA' PER AZIONI, Monte San Vito (AN) (IT)

(72) Inventors: Francesco Violi, Sant'ilario d'Enza (IT); Emanuele Ugolotti, San Paolo d'Enza (IT); Maurizio Arletti, Reggio Emilia (IT)

(73) Assignee: ASK INDUSTRIES SOCIETA' PER AZIONI, Monte San Vito (AN) (IT)

( * ) Notice: Subject to any disclaimer, the term of this patent is extended or adjusted under 35 U.S.C. 154(b) by 0 days.

(21) Appl. No.: 14/987,149

(22) Filed: Jan. 4, 2016

(65) Prior Publication Data

US 2016/0205472 A1 Jul. 14, 2016

(30) Foreign Application Priority Data

Jan. 13, 2015 (IT) .............................. AN2015A0004

(51) Int. Cl.
*H04R 3/12* (2006.01)
*B60Q 5/00* (2006.01)
*G10K 15/02* (2006.01)

(52) U.S. Cl.
CPC ................. *H04R 3/12* (2013.01); *B60Q 5/00* (2013.01); *G10K 15/02* (2013.01); *H04R 2430/01* (2013.01); *H04R 2499/13* (2013.01)

(58) Field of Classification Search
CPC .. H04R 3/12; H04R 2430/01; H04R 2499/13; B60Q 5/00
See application file for complete search history.

(56) References Cited

U.S. PATENT DOCUMENTS

| | | | | |
|---|---|---|---|---|
| 4,715,559 A * | 12/1987 | Fuller | ................ | G10K 11/1786 181/206 |
| 5,371,802 A * | 12/1994 | McDonald | ............. | G10K 15/02 381/110 |
| 6,672,434 B2 * | 1/2004 | Schnur | ................... | F16F 15/005 188/266.7 |
| 7,203,321 B1 | 4/2007 | Freymann et al. | | |
| 7,961,894 B2 * | 6/2011 | Honji | ...................... | G10K 15/02 340/384.3 |
| 8,155,343 B2 * | 4/2012 | Honji | ...................... | G10K 15/04 381/61 |
| 8,300,842 B2 * | 10/2012 | Vaishya | ................. | G10K 15/02 381/71.14 |
| 2010/0266134 A1 * | 10/2010 | Wertz | ................... | G10K 11/178 381/71.1 |

(Continued)

FOREIGN PATENT DOCUMENTS

| | | | | |
|---|---|---|---|---|
| DE | 102012025583 A1 * | 4/2014 | ............. | B60Q 5/008 |
| GB | WO 9013109 A1 * | 11/1990 | ............. | G10K 15/02 |

*Primary Examiner* — Brenda Bernardi
(74) *Attorney, Agent, or Firm* — Egbert Law Offices, PLLC (57) ABSTRACT

A sound enhancement system of an engine of a vehicle includes a vibration sensor disposed on the casing of the engine to generate an electrical signal indicative of the engine sound. A signal processor is connected to the vibration sensor to process the electrical signal-indicative of the engine sound and generate an output audio signal. A speaker is disposed in the vehicle compartment and connected to the signal processor to receive the output audio signal and generate an enhancement sound of the engine sound.

10 Claims, 10 Drawing Sheets

(56) References Cited

U.S. PATENT DOCUMENTS

| | | | | |
|---|---|---|---|---|
| 2012/0170795 A1* | 7/2012 | Sancisi | ............... | H04R 9/043 381/413 |
| 2012/0177214 A1* | 7/2012 | Hera | ............... | G10K 15/02 381/73.1 |
| 2013/0259259 A1* | 10/2013 | Hera | ............... | G10K 15/02 381/86 |
| 2015/0279346 A1* | 10/2015 | Hera | ............... | G10K 11/18 381/86 |
| 2016/0300559 A1* | 10/2016 | Lee | ............... | G10K 11/16 |

* cited by examiner

ENGINE SOUND ENHANCEMENT SYSTEM OF A VEHICLE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to an engine sound enhancement (ESE) system of a vehicle.

2. Description of Related Art Including Information Disclosed Under 37 CFR 1.97 and 37 CFR 1.98

As it is known, most vehicles are provided with an internal combustion engine. Each internal combustion engine is characterized by a typical sound, according to its structure, horsepower and piston displacement. Generally, each car manufacturer is distinguished by a typical engine sound.

In order to improve passenger comfort and make the vehicle as noiseless as possible, vehicle compartments are acoustically insulated from the hood that contains the engine. Consequently, the car driver inside the compartment cannot hear the engine sound while driving. Such a noiseless condition of the vehicle results in some drawbacks, especially in the case of sports cars, for which it is useful for the driver to hear the engine sound in order to decide a driving style.

U.S. Pat. No. 7,203,321 discloses a sound enhancing system comprising:

- a sound pressure sensor positioned proximal to or within one of an intake tract and an exhaust tract of the motor to detect the motor sound pressure,
- a signal processing unit that processes the signal of the sound pressure sensor,
- a synthesizer that outputs a synthesized signal,
- an adder that adds the signal from the sound pressure sensor to the synthesizer signal and sends the output signal to a speaker that generates an enhancing sound.

Nevertheless, said system is not effective, especially because the sound pressure sensor is disposed in the intake tract or in the exhaust tract and is not capable of detecting the real motor sound accurately because said sound pressure sensor only considers the sound generated by the sound pressure that propagates in the intake tract or in the exhaust tract, without considering the real sound caused by the vibration of the motor casing.

For this reason, the audio signal generated only by the sound pressure sensor is not satisfactory in order to reproduce the real motor sound. It is therefore necessary to use a synthesizer and generate a (completely artificial) synthesized signal that is added to the sound pressure signal detected by the sound pressure sensor. Evidently, the artificial sound generated from the synthesized signal can never be identical to the real motor sound.

U.S. Pat. No. 8,300,842 discloses a noise enhancement system of the engine, comprising:

- a speaker for generating a noise enhancement signal; and
- a controller that controls the speaker with a control signal corresponding to the noise enhancement signal.

The controller receives only one signal indicative of the engine speed, which is obtained from a vehicle tachometer, and adds additional values to said engine speed signal for calculating the control signal based upon a predicted future engine sound. The predicted future engine sound is determined using the input signal from the vehicle tachometer and a value derived from the input signal from the vehicle tachometer indicative of engine angular acceleration.

Also this system is not very accurate because it generates a completely artificial signal based on values obtained from the tachometer and processed by means of a complex algorithm; moreover, it does not take into account the real sound generated by the engine.

Engine sound enhancement systems are known, comprising a plurality of microphones disposed in various parts of the vehicle and a mixer that mixes the signals coming from said microphones. A plurality of sensors continuously detects the driving conditions of the vehicle and controls the gain of the signals from said microphones. In order to operate these systems need a plurality of microphones and are therefore expensive, complicated and cumbersome.

BRIEF SUMMARY OF THE INVENTION

It is an object of the present invention to eliminate the drawbacks of the prior art, by providing an engine sound enhancement system that is capable of introducing a sound in the vehicle compartment that is as close as possible to the real sound of the vehicle engine.

Another object of the present invention is to provide an engine sound enhancement system that is efficient, accurate, reliable, versatile and at the same time inexpensive and easy to install and use.

The aforementioned objects are achieved according to the invention, with the characteristics claimed in the independent claim 1.

Advantageous embodiments of the invention appear from the dependent claims.

The system of the invention comprises:

- a vibration sensor disposed on the engine casing to detect the vibrations of the engine casing and generate a signal indicative of the engine sound;
- a signal processor connected to the vibration sensor to process said signal indicative of the engine sound and generate an output audio signal, and
- a speaker disposed in the vehicle compartment and connected to said signal processor to receive said output audio signal and generate a sound to enhance the engine sound.

The vibration sensor is a shaker or exciter-type mechanical electrical transducer, comprising a fixed part firmly connected to the engine casing and a mobile part that moves with respect to the fixed part. When the engine casing suffers a vibration alteration, the mobile part moves with respect to the fixed part and the shaker detects and transduces the vibration speed of the engine casing, which is indicative of the sound generated by the engine.

The advantages of the system according to the present invention, which uses a shaker-type vibration sensor on the engine casing, instead of pressure sensors in the extraction or exhaust pipe of the engine, are evident.

By using a shaker the system of the invention avoids all kind of artificial synthesizing of a signal that simulates the engine sound. Moreover, such a system eliminates the use of a plurality of microphones, as well as the need to mix the sound from the various microphones. Moreover, such a system obtains a signal that is very close to the real engine sound.

BRIEF DESCRIPTION OF THE SEVERAL VIEWS OF THE DRAWINGS

Additional characteristics of the invention will appear evident from the detailed description below, which refers to merely illustrative, not limiting, embodiments, illustrated in the attached drawings, wherein.

DETAILED DESCRIPTION OF THE INVENTION

With reference to the figures, the engine sound enhancement system of the invention is disclosed, being generally indicated with reference numeral (100).

Figure 1:
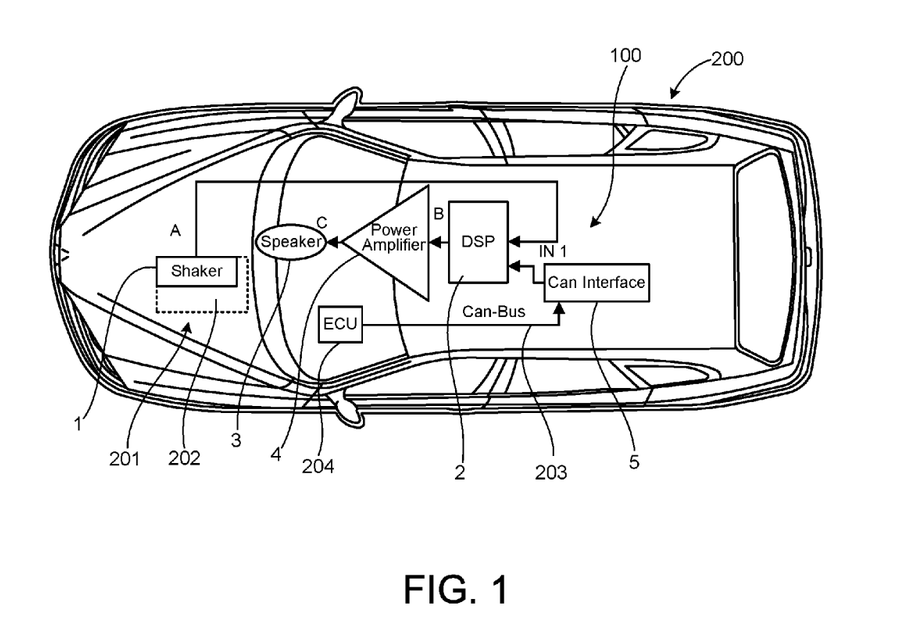
FIG. 1 is diagrammatic top view of a vehicle wherein the engine sound enhancement system of the invention is installed.

FIG. 1 shows a basic version, wherein the system (100) has no interaction with the pre-existing audio system of the vehicle. However, according to a more advanced version, the system (100) is integrated with the audio system installed in the vehicle, sharing one or more channels and one or more 5 speakers with it.

Figure 2:
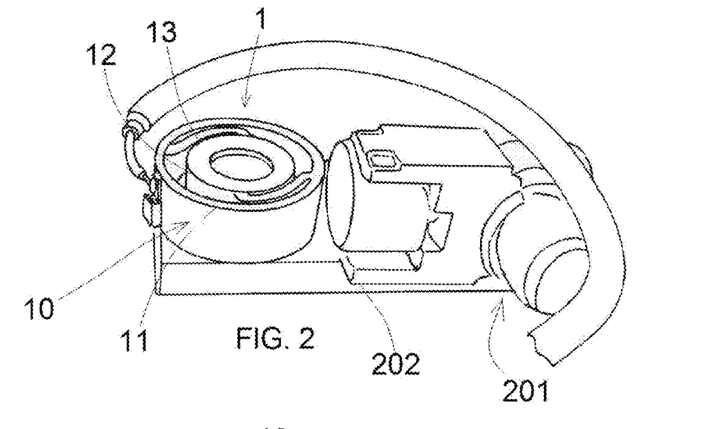
FIG. 2 is a diagrammatic perspective view of a shaker-type vibration sensor mounted on the engine casing of the vehicle.

Referring to FIGS. 1 and 2, the system (100) is installed in a vehicle (200). The vehicle (200) comprises an engine (201) that can be an internal combustion engine, an electrical engine or any other type of propulsion engine contained in the vehicle hood. The engine (201) comprises a casing (202) that contains the various parts of the engine. As it is known, during the operation of the engine, the casing (202) suffers instantaneous accelerations and vibrates, generating a typical engine sound in the surrounding air.

The system (100) comprises a vibration sensor (1) suitably disposed on the casing (202) of the engine. Advantageously, a housing intended to contain the vibration sensor (1) is obtained on the engine casing.

The vibration sensor (1) is intended to detect the vibrations (202) of the engine casing that generate the typical sound of the engine (201) in the surrounding air. Therefore the vibration sensor (1) works as an original sound sensor.

Advantageously, the vibration sensor (1) is a shaker or exciter-type mechanical-electrical transducer that detects the vibrations of the engine casing (202) and accordingly generates an electrical signal (A) proportional to the instantaneous speed applied to the mobile part of the vibration sensor. Said electrical signal (A) of analogue type is indicative of the instantaneous acceleration of the engine casing.

Such a type of shaker transducer is disclosed in patent EP2476264B1 in the name of the same applicant. The vibration sensor (1) is a shaker or exciter-type mechanical-electrical transducer, comprising a fixed part firmly connected to the casing (202) of the engine and a mobile part elastically fixed to the fixed part, in such manner that the mobile part can move with respect to the fixed part.

According to a preferred embodiment of the invention, the fixed part comprises a coil and the mobile part comprises a magnetic unit that generates an air gap. Also the opposite situation can be provided, wherein the fixed part comprises a magnetic unit that generates an air gap and the mobile part comprises a coil.

When the casing of the engine suffers a vibration alteration, the mobile part moves with respect to the fixed part with an alternative axial motion and the shaker detects and transduces the vibration speed of the engine casing, generating an electrical signal (A) at the ends of the coil that is indicative of the sound generated by the engine.

According to a preferred embodiment of the invention, the fixed part of the vibration transducer (1) comprises a plastic shell comprising two welded parts: a base and a cover. A very thin cylindrical support is rigidly fixed in central position inside the base, whereon a coil is wound in such manner to stay inside an air gap with annular shape obtained in a magnetic circuit forming the mobile part. Then the mobile part comprises the magnetic circuit composed of a permanent magnet disposed between two polar plates; the air gap is obtained between the two polar plates, having a radial thickness lower than the thickness of the coil contained in the fixed part. Therefore, the mobile part can make a certain two-directional axial translation on the fixed coil immersed in the air gap.

The fixed part and the mobile part of the shaker are connected by means of a centering element (10) acting as elastic suspension. The centering element (10) comprises an external ring (11) connected to the mobile part, an internal ring (12) connected to the fixed part and a plurality of elastic spokes (13) connecting the external ring (11) to the internal ring (12). The centering element (10) maintains the mobile part in a perfectly centered position with respect to the coil immersed in the air gap generated by the mobile part.

Figure 3:
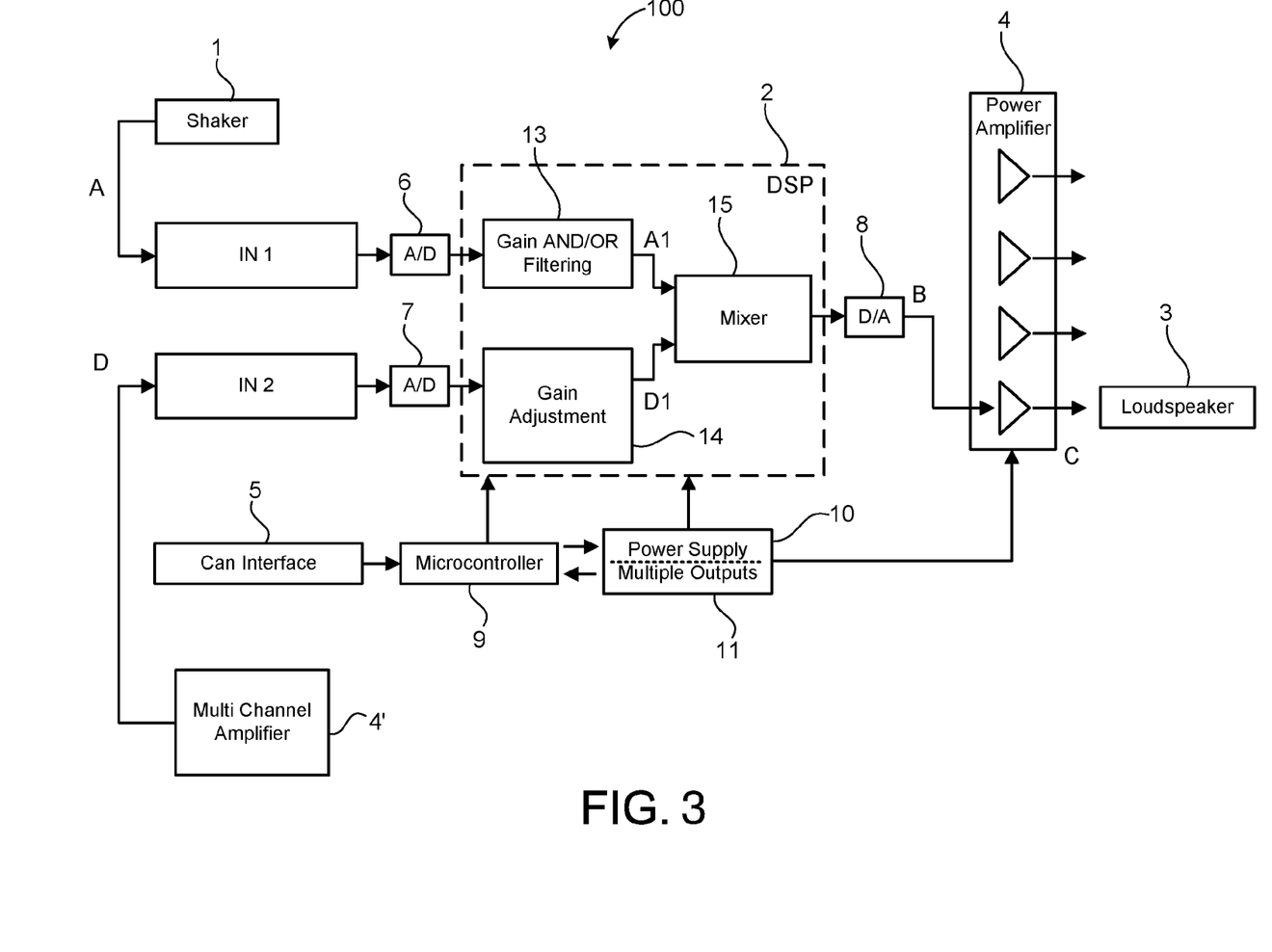
FIG. 3 is a block diagram showing the engine sound enhancement system of the invention.

The vibration sensor (1) is connected to a first input (IN1) of a digital signal processor (DSP) (2). The DSP (2) processes the electrical signal (A), which is indicative of the acceleration of the engine casing, in such manner to obtain an output audio signal (B) to be sent to one or more speakers (3) disposed in the compartment of the vehicle (200) through an internal amplifier (4). According to an amplified audio signal (C) from the internal amplifier (4), the speaker (3) generates an enhancement sound in the vehicle compartment, which is very similar to the sound of the engine (201).

The speaker (3) can be any speaker provided in the audio system of the vehicle (200) or it can be a speaker especially dedicated to the enhancing sound, for example a shaker-type speaker, such as the one disclosed in EP2476264. In the latter case, if the speaker (3) is a shaker, it does not have a sound membrane and is fixed to the vehicle body in order to put the vehicle body into vibration and generate said engine enhancing sound.

Referring to FIG. 3, the vehicle (200) may comprise an audio multi-channel power amplifier (4') that is already provided in the vehicle for amplifying the audio system of the vehicle connected to the head unit or car radio. The audio multi-channel power amplifier (4') controls a plurality of speakers provided in various positions in the vehicle compartment. Said speakers include a central speaker, similar to the speaker (3), which is generally provided in the vehicle dashboard.

In such a case, the audio multi-channel power amplifier (4') generates an audio signal (D) that is sent to a second input (IN2) of the DSP and enters the DSP (2) through an A/D converter (7). The audio signal (D) of the audio multi-channel power amplifier (4') goes to a gain adjustment stage (14) from which an adjusted audio signal (D1) is generated.

The electrical signal (A) of the shaker passes through a gain and/or filtering block (13) that generates an enhancing signal (A1) indicative of the engine noise.

The adjusted audio signal (D1) from the gain adjustment stage (14) is mixed with the enhancing signal (A1) from the gain and/or filter block (13) using a mixer (15). The output of the mixer (15) is sent to a D/A converter (8) that generates the analog audio signal (B) that is amplified by the internal amplifier (4) and sent to the central speaker (3) as an amplified signal (C).

The same configuration of FIG. 3 can be made for additional speakers of the vehicle, such as the woofers that are generally provided in the front and back doors of the vehicle. In such a case, as shown in FIG. 3, multiple inputs, which are similar to the second input (IN2) that receives the audio signal (D), and gain adjustment blocks, which are similar to the gain adjustment block (14), are implemented. In view of the above, the central speaker (3) or all the other speakers of the vehicle can play both the adjusted audio signal (D1) normally obtained in the vehicle and the enhancing signal (A1) obtained with the system (100).

Various types of sensors were assessed while testing the system (100) in order to find the most suitable one to capture the engine sound to be processed in the DSP(2).

The first sensor to be tested was a pressure sensor inside the extract pipe of the engine (as suggested by U.S. Pat. No. 7,203,321). Such a pressure sensor is already provided in the engine to assist the vehicle control unit (ECU). The sensor, which is practically similar to a microphone, cannot be used in turbo engines because the sensor receives a pressure wave that is translated in a strong bump in the amplifier input.

Figure 9:
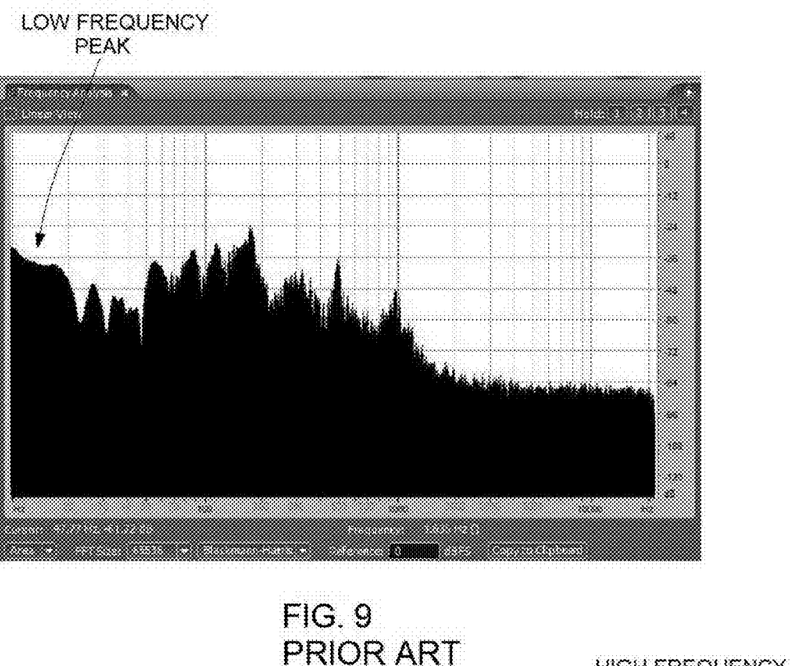
FIGS. 9, 10, 11 are three diagrams respectively showing the spectrum of the engine audio signal detected by three sensors according to the prior art.

FIG. 9 shows the spectrum of the signal detected by the pressure sensor in the engine extract pipe, which shows a low frequency peak due to the turbo pressure bump.

Also two types of accelerometers that are commonly found on the market were tested, i.e. a piezo-electric accelerometer and a MEMS (Micro Electro-Mechanical System) accelerometer fixed both to the engine head and to the extract pipe. The operation of the two accelerometers was excellent, except for the sensitivity to all engine noises, especially at high frequencies. Such noise sensitivity to high frequencies did not permit to obtain the desired noise. In fact, for frequencies higher than KHz, the detected sounds are sounds generated by mechanical accessories (i.e. valves and cams), and not engine sounds.

Figure 10:
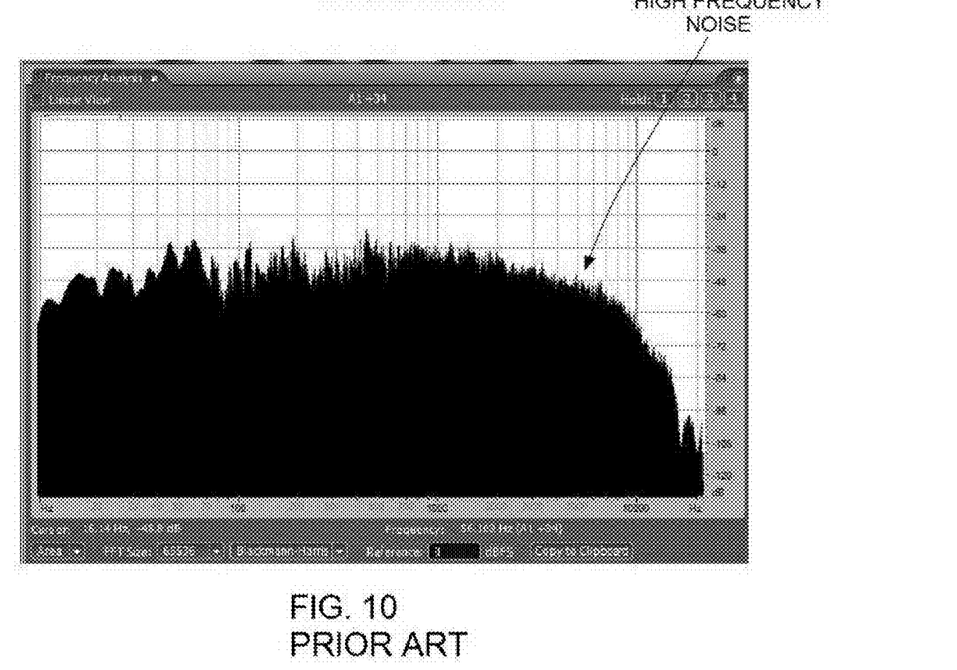
Figure 11:
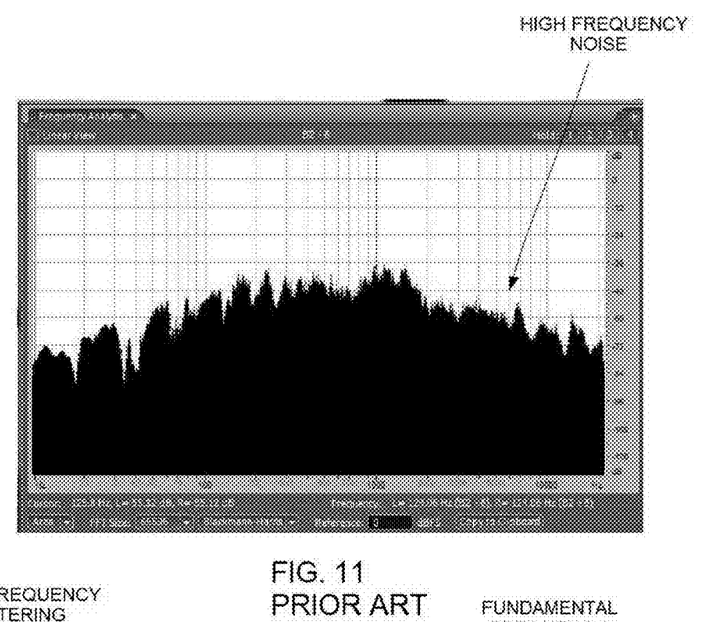

FIG. 10 and FIG. 11 show the spectrum of the signals detected by the piezo-electric accelerometer and by the MEMS accelerometer respectively, showing the high frequencies in which the signal is disturbed by the noise generated by the mechanical accessories of the vehicle.

Finally, an exciter-type (shaker) vibration sensor (1) was tested as acceleration sensor, it being used as sensor (mechanical-electrical transducer) and not as speaker (electroacoustic transducer).

Figure 12:
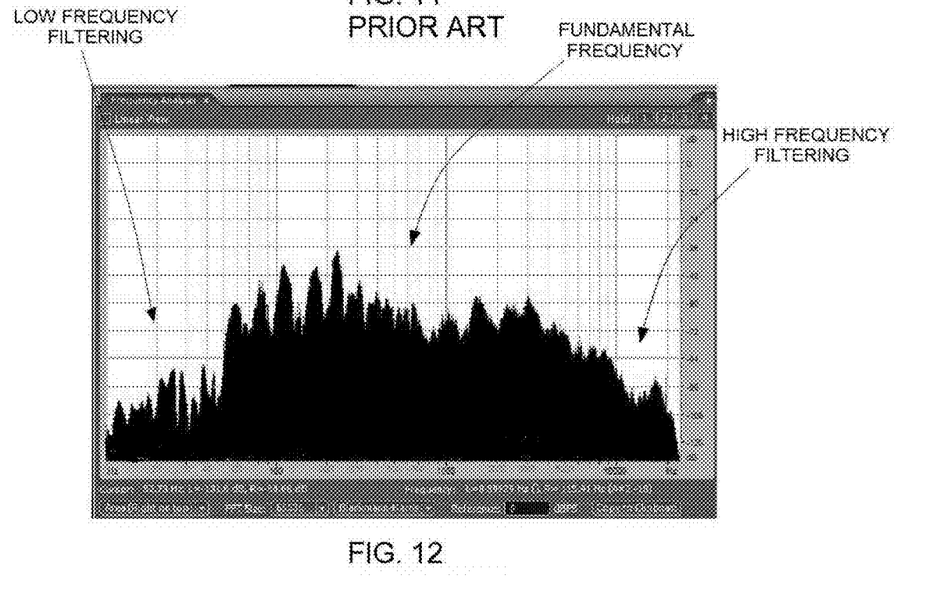
FIG. 12 is a diagram showing the spectrum of the engine audio signal detected by a shaker-type vibration sensor according to the invention.

FIG. 12 shows the spectrum of the signal detected by the exciter (1) during the real operation of a turbo engine. As it is clearly shown in FIG. 12, the exciter acts as band-pass filter and filters the turbo bump at low frequencies, and the noise of the mechanical parts of the vehicle at high frequencies, thus permitting a clear recording of the engine orders (engine fundamental frequency and relative harmonics).

The use of an electrodynamic shaker as vibration transducer implies that the sensor has a considerable mass in comparison with an ordinary vibration sensor. This resulted in some apparent disadvantages, such as low vibration sensitivity and a frequency response that decreases when frequency increases.

However, the use of a shaker resulted in the following advantages:
 a very low internal impedance of the sensor that guarantees immunity to interference coming from the other electrical systems installed in the engine;
 the weight of the mobile part of the shaker applies a natural low-pass filter to the detected signal, which is translated in high immunity to undesired high frequency impulsive noise; and
 the low-pass effect with the high-pass effect coming from the resonance of the mass
 elastic suspensions system of the shaker is translated in an ideal band-pass behavior for a sensor that operates in difficult conditions with undesired high and low frequency noise.

Figure 13:
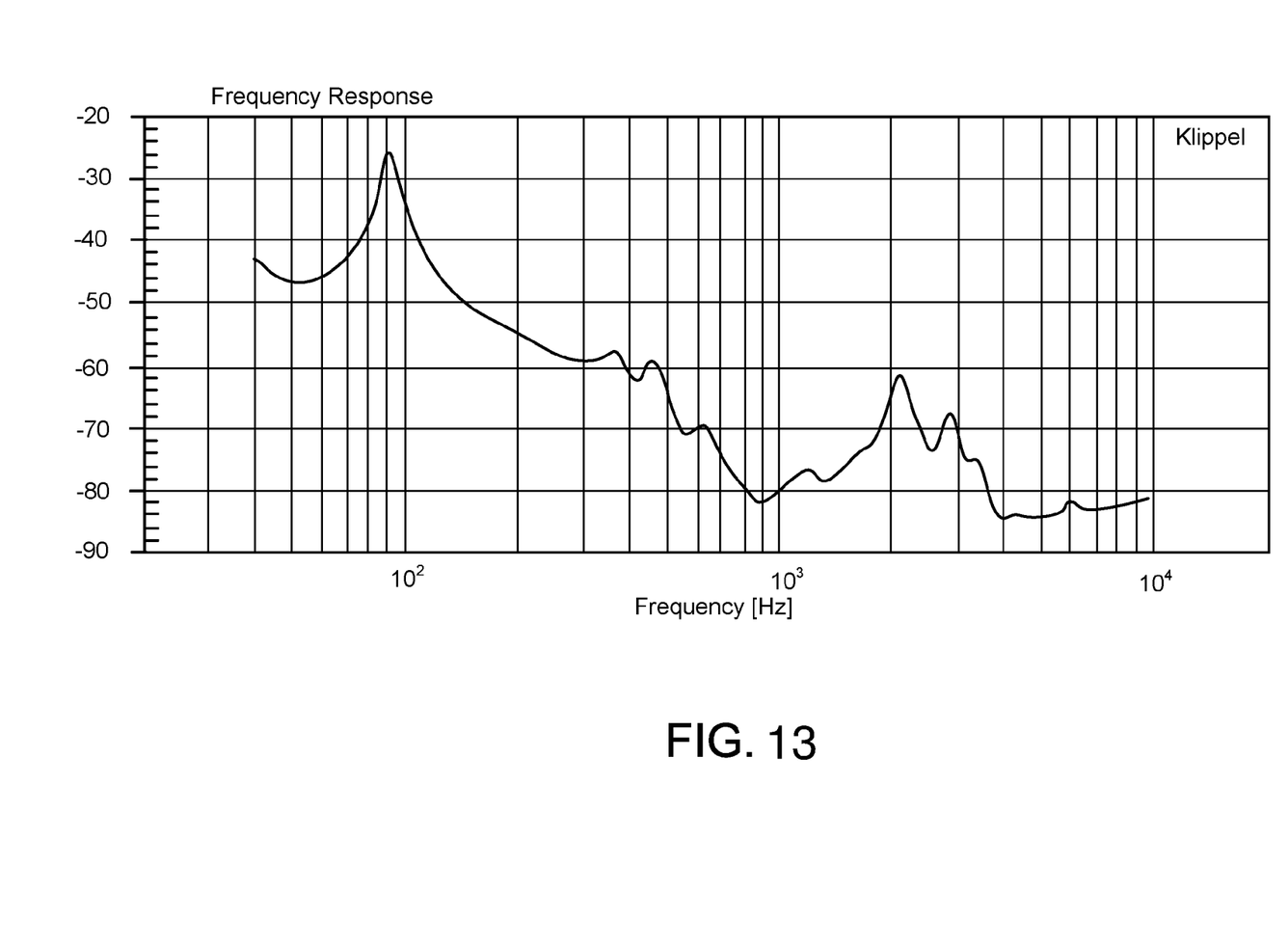
FIG. 13 is the frequency response of the shaker excited with a vibration with constant acceleration produced by a sample exciter.

The shaker-type vibration sensor (1) is not exactly an accelerometer, but a velocimeter or an accelerometer integrator. The voltage generated at the ends of the mobile coil of the shaker, when the mobile part moves (because of vibrations), is proportional to the instantaneous speed of the mobile part that is translated in the aforementioned low-pass response relatively to its instantaneous acceleration.

As shown in FIG. 13, by exciting the shaker with a constant acceleration produced by a sample exciter, the shaker behaves as a low-pass filter, i.e. it mathematically corresponds to an integration of the input signal. The shaker is therefore an accelerometer with an integrated natural low-pass filter.

Compared to the shaker illustrated in EP2476264A1, the shakertype vibration sensor (1) of the present invention is advantageously provided with some improvements.

The vibration sensor (1) has two magnetic parts and two coil parts in opposite position, in order to have a balanced output signal. In this way, because of its low impedance and of the balanced output signal, the vibration sensor (1) is free from external interference. Such a result can be obtained by providing two vibration sensors (1) with single coil in a push-pull configuration, i.e. with the coils or the magnetic parts in opposite position.

Each spoke (13) of the centering element (10) is made of two different materials: a first part of the spoke is made of a metallic material, such as phosphorous bronze, to withstand high temperatures and a second part of the spoke is made of plastics to have a suitable dampening of the mobile part.

The vehicle (200) comprises a CAN-bus (Controller Area Network) (203) that connects various electronic control units (ECU) (204) of the vehicle. The system (100) comprises a CAN interface (5) connected to the CAN-bus (203) and to the DSP (2).

Various messages are transported on the CAN-bus (203) and are exchanged between the various ECU's (204), such as the Body Computer. In particular, the CAN-bus (203) will transport:
- a first message with information on the number of revolutions (RPM) of the engine, and
- a second message with information on the value of the torque (Torque) developed by the engine.

In the most advanced cars, the user can choose the car attitude according to the driving style he wants to use. Generally speaking, it is possible to choose at least between two attitudes. Systems that allow for choosing between four attitudes are known, being defined as RDNA (Race; Direct; Natural; All-weather). In such a case also a third message will be transported on the CAN-bus (203), with information on RDNA four-position control for the car attitude chosen by the user.

The CAN interface (5) is a receiver-transmitter that is programmed in such manner to take from the CAN-bus (203) the information transported on the CAN-bus: RPM, and Torque. If the vehicle provides for different driving styles that result in some changes of the vehicle attitude (i.e. more rigid suspensions, fume exhaust in more or less open position or in bypass position, air extraction in more or less open position), that is to say changes of the RDNA signal, then the CAN interface (5) will detect also the values of the RDNA signal.

As shown in FIG. 3, the electrical signal (A) transduced by the vibration sensor (1) and the audio signal (D) from the audio multichannel power amplifier (4') are analogue signals. However, the DSP (2) can only process digital signals. Therefore the system (100) comprises a first analogue-digital converter (6) to convert the electrical analogue signal (A) from the vibration sensor (1) into a digital signal and a second analogue-digital converter (7) to convert the audio analogue signal (D) from the audio multi-channel power amplifier (4') into a digital signal.

The system (100) comprises a microcontroller (9) disposed between the CAN interface (5) and the DSP (2). The microcontroller (9) receives the RPM, Torque and RDNA values from the CAN interface (5) and sends these values to the DSP (2). The microcontroller (9) can 25 be incorporated in the DSP (2).

The system (100) also comprises:
- an electrical power supply (10) to power the microcontroller (9), the DSP (2) and the power amplifier (4); and
- a power supply with multiple stabilized outputs (11) to power the microcontroller (9), the DSP (2) and the internal power amplifier (4).

The DSP (2) comprises a gain and/or filtering block (13) to apply a gain and/or filtering to the electrical digital signal (A) from the first analogue-digital converter (6) according to the RPM, Torque and optionally RDNA values from the micro controller (9). The gain and/or filtering block (13) generates an enhancing signal (A1) that is processed according to the RPM, Torque and RDNA signals.

The DSP (2) comprises a gain adjustment block (14) to adjust the gain of the audio signal from the second analogue-digital converter (7) downstream the input (IN2) connected to the output of the audio multi-channel power amplifier (4'). The gain adjustment block (14) generates an adjusted audio signal (D1).

The engine sound enhancement system (100) tends to change the acoustics of the vehicle audio system. Therefore, the gain adjustment block (14) is set in such manner not to change the acoustics of the vehicle audio system. Therefore the level of the adjusted audio signal (D1) from the gain adjustment block (14) is such not to change the acoustics of the vehicle audio system, maintaining the same acoustics that the vehicle audio system would have without the system (100).

The DSP (2) comprises a mixer (15) that receives the enhancement signal (A1) from the gain and filtering block (13) and the adjusted audio signal (D1) from the gain adjustment block (14). The two signals (A1) and (D1) are mixed in the mixer (15) in such manner to obtain the output audio signal (B).

The enhancement signal (A1) from the DSP and the adjusted audio signal (D1) from the multi-channel power amplifier (4') of the vehicle are mixed in the mixer (15) in order to use the engine enhancement also in the presence of an audio or music signal coming from the vehicle audio system. Evidently, the enhancement signal (A1) can be used without the adjusted audio signal (D1) and vice versa.

The output audio digital signal from the mixer (15) is sent to the digital-analogue converter (8) and the output audio analogue signal (B) from the digital-analogue converter (8) is sent to the internal power amplifier (4). The amplified audio signal (C) from the internal power amplifier (4) is sent to the speaker (3) in the car compartment in order to generate an enhancement sound of the vehicle engine.

Although the block diagram of FIG. 3 shows that the DSP (2) comprises only the gain and/or filtering block (13), the gain adjustment block (14) and the mixer (15), evidently the DSP can also comprise additional blocks shown in the diagram of FIG. 3, such as for example the first input (IN1), the second input (IN2), the analogue-digital converters (6, 7), the digital-analogue converter (8), the CAN interface (5) and the microcontroller (9). It must be noted that multiple inputs similar to the second input (IN2) may be provided to send the enhancement signal to multiple speakers, and not only to the central speaker (3).

Sending the enhancement signal (A1) together with the adjusted audio signal (B1) only to the central speaker (3) is a special case of a more general system wherein the enhancement signal (A1) (either alone or mixed with the adjusted audio signal (B1)) is sent to any one of the vehicle speakers.

Moreover, an analogue signal processor can be provided instead of the DSP (2).

Figure 4:
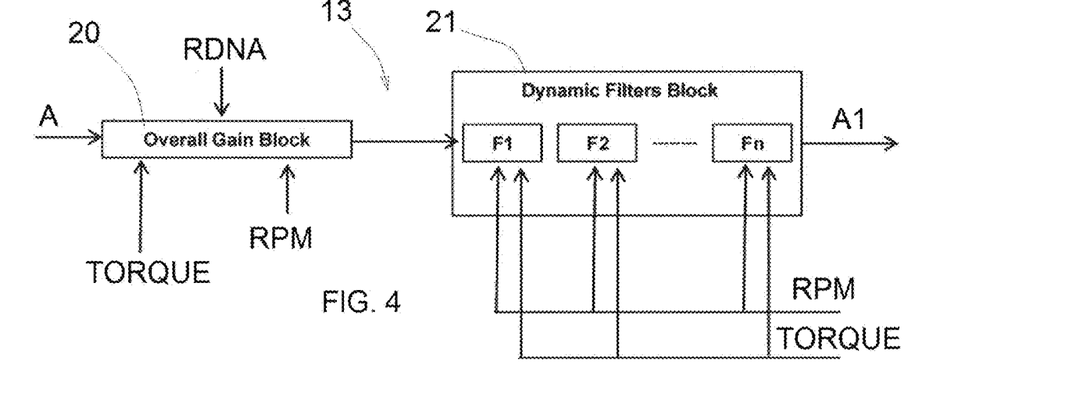
FIG. 4 is a block diagram showing the gain and filtering block of FIG. 3 in detail.

As shown in FIG. 4, the gain and/or filtering block (13) comprises an overall gain block (20) and/or an array of dynamic filters (21).

The overall gain block (20) imposes the overall gain to be applied to the electrical signal (A) coming from the vibration sensor (1) for specific RDNA, RPM and Torque values detected by the CAN-bus through the CAN interface (5).

A 3D map (or look-up table) with RPM as X axis, Torque as Y axis and overall gain as Z axis is created for every RDNA value (Race, Dynamic, Natural, All-weather). In consideration of four RDNA driving styles, it is necessary to create four look-up tables. The values entered in said tables are obtained by means of tuning during the various experimental tests or with simulators that simulate the engine noise in the various vehicle attitudes (RDNA) or directly on the test vehicle, always in the various vehicle attitudes (RDNA) and according to the RPM and Torque values. The look-up tables are saved in the overall gain block (20).

Figure 6:
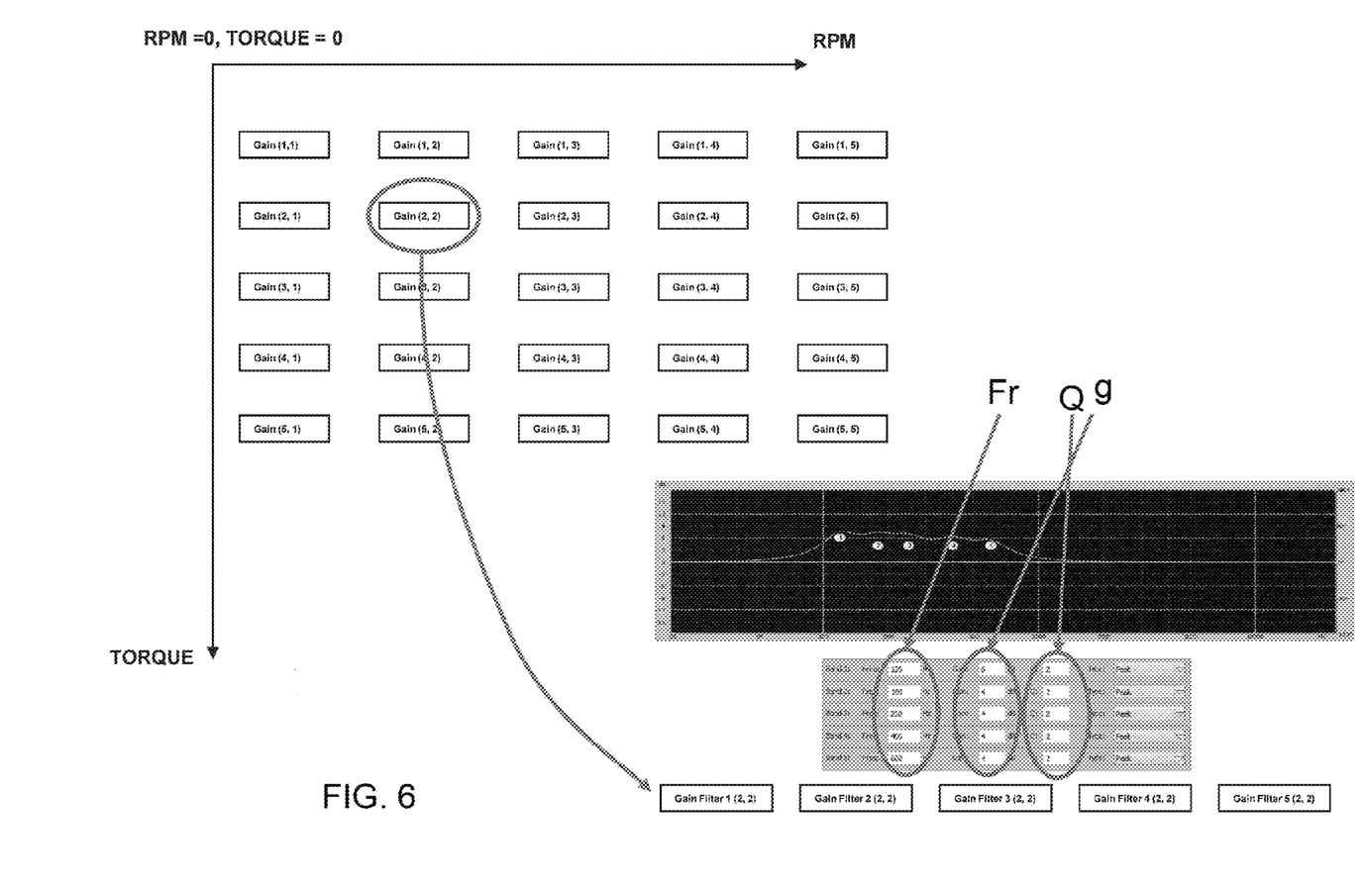
FIG. 6 is a Cartesian graph with two axes, wherein a gain table, a filter array with relevant filter table and a Cartesian graph of the signal filtering are included.

As shown in FIG. 6, every look-up table can be created by generating a matrix ($G_{11}, \ldots G_{55}$) of overall gain values (for example a matrix 5×5=25 overall gain values) in a Cartesian graph (X=RPM; Y=Torque).

Figure 6A:
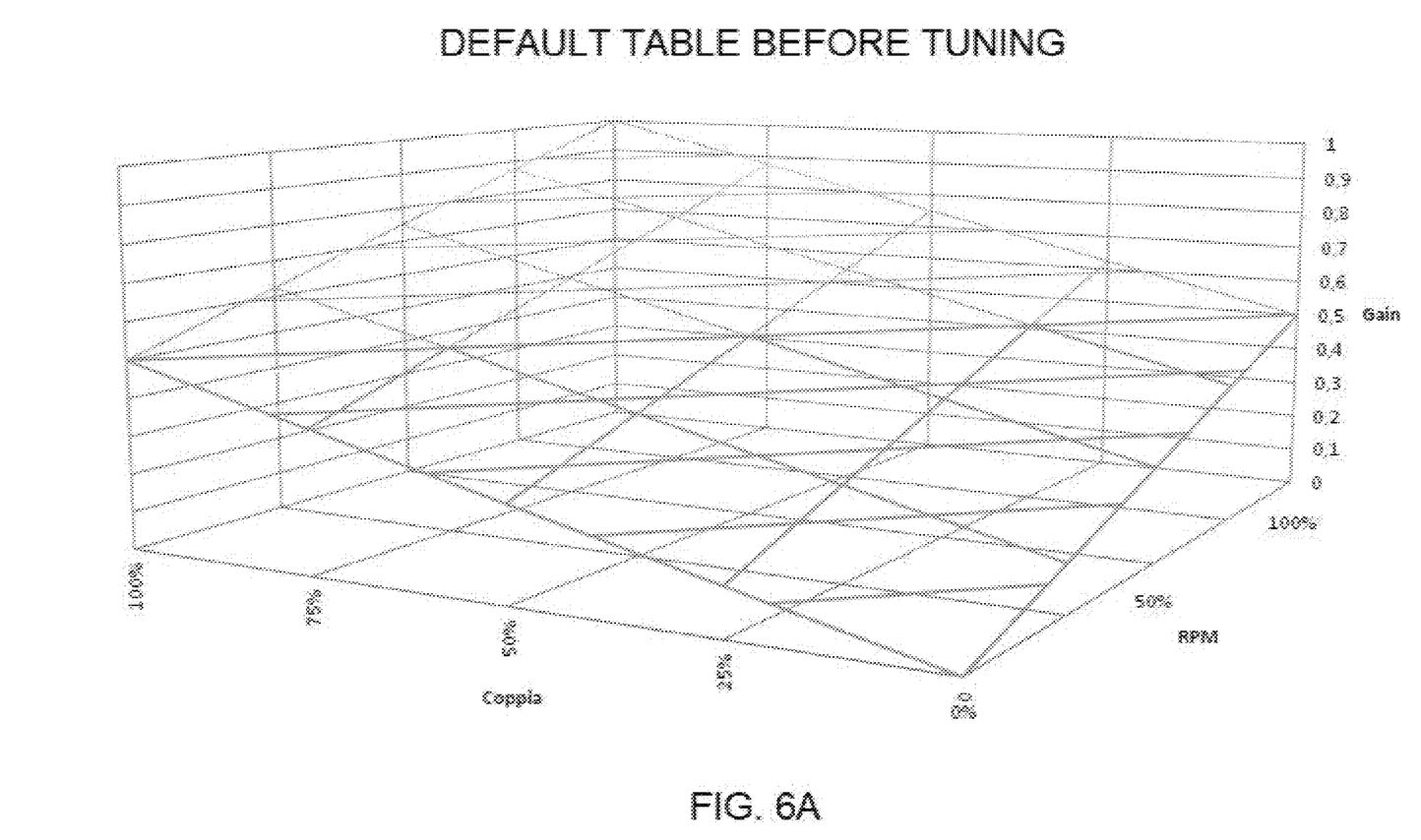
FIG. 6A is a Cartesian graph with three axes of a default table before tuning.
Figure 6B:
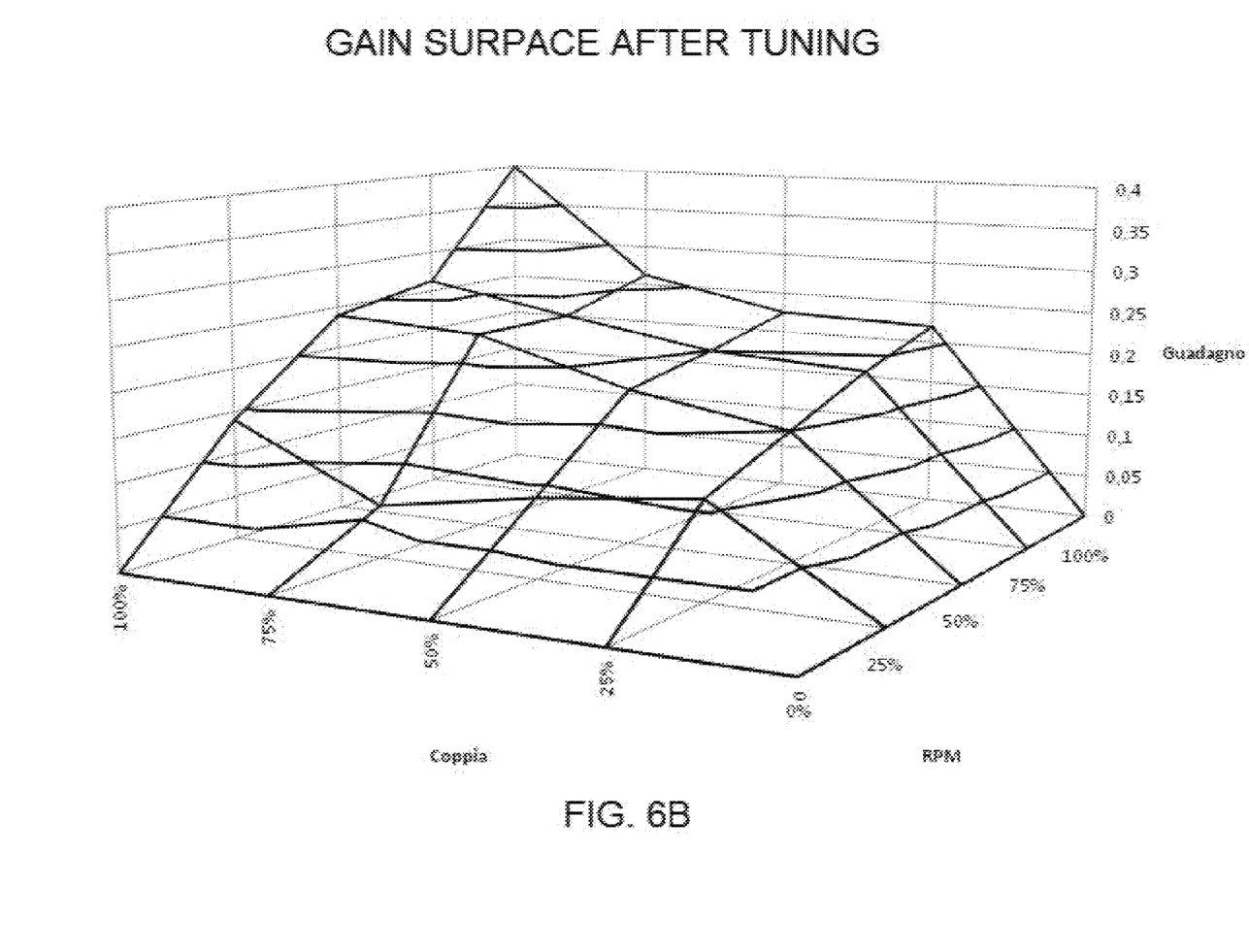
FIG. 6B is a Cartesian graph with three axes of a gain surface after tuning.

As shown in FIG. 6A (before Tuning or Default situation) and FIG. 6B (after tuning), the Cartesian axes of a Cartesian graph define the minimum (Rmin) and maximum (Rmax) RPM values and the minimum (Tmin) and maximum (Tmax) Torque values. Each (Rmin)-(Rmax) and (Tmin)-(Tmax) range is divided in four identical sub-ranges, identifying five points on each Cartesian axis respectively corresponding to Rmax and Tmax percentage values of 0%; 25%; 50%, 75% and 100%. Straight lines parallel to the Cartesian axes are traced from these points on the Cartesian axes. The straight lines cross, forming 25 nodal points. An overall gain value is assigned to every nodal point in order to generate the overall gain matrix.

The 25 overall gain values of the matrix are the result of tuning, corresponding to 5 specific RPM values and 5 specific Torque values. The overall gain values harmonize the engine sound generated by the electrical signal (A) coming from the vibration sensor with the sound that is naturally already present in the car compartment. The sound generated from this combination must be successively assessed and agreed with the car manufacturer, being submitted to successive tuning stages. For this reason a specific tuning software is provided, which runs on an ordinary PC and is provided with a Graphic User Interface (GUI) that is user-friendly. The PC is connected to the internal amplifier (4) through an RS232 serial port and the tuning software acts in real time on the DSP (2). The software is used to model the 3D diagram of FIG. 6B (RPM, Torque, overall gain values (G)) and to extract all overall gain values (G) obtained with linear interpolation.

The overall gain block (20) has the following functions:
to receive the RDNA, RPM and Torque values from the CAN interface (5),
to consult the correct look-up table according to the received RDNA, RPM and Torque values, and
to find in the look-up table the overall gain to be applied to the electrical signal (A) detected by the vibration sensor (1).

It must be considered that the RDNA value is the vehicle attitude set by the user. Instead, the RPM and Torque values are values that are continuously detected by the vehicle control unit while the vehicle is running.

Figure 7:
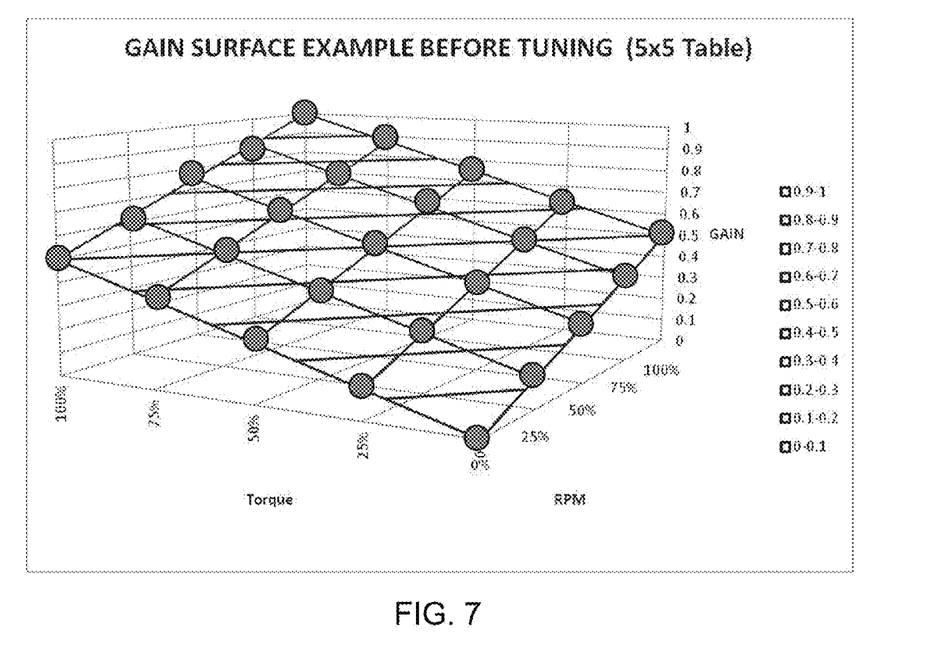
FIG. 7 is a Cartesian graph with three axes, same as FIG. 6A, showing an example of an overall gain surface before equalizing the overall gain values.

FIG. 7 shows an example of an overall gain surface in a 3D Cartesian graph, before tuning the values of the overall gain matrix (Default situation). In such a case, the overall gain surface is an inclined plane with overall gain values that increase linearly when the RPM and Torque values increase.

Figure 8:
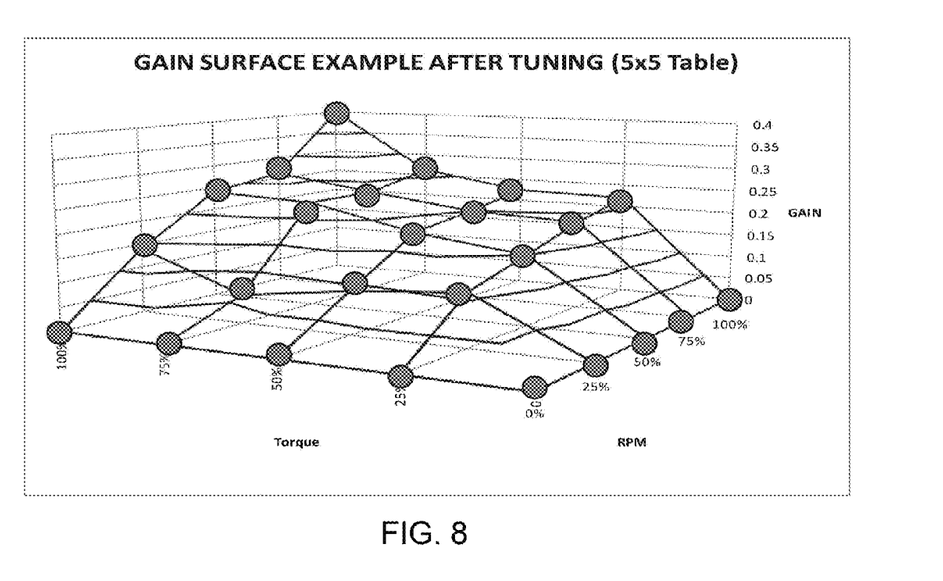
FIG. 8 is a Cartesian graph with three axes, same as FIG. 6B, showing the overall gain surface and the tuning of the overall gain values.

FIG. 8 shows an example of the overall gain surface of FIG. 7, after tuning the values of the overall gain matrix. In such a case, the overall gain surface is irregular because it depends on the tuning made. Therefore, when the pair of RPM and Torque values detected by the CAN interface (5) does not exactly fall in one of the 25 points shown in the diagram of FIG. 8, the overall gain is calculated with linear interpolation between the closest points. Interpolation can also be nonlinear, for example a cubic spline can be used.

The dynamic filters array (21) comprises a plurality of filter arrays, that is to say a filters array (F1, F2, . . . F5) for each overall gain value of the overall gain matrix. The example of FIG. 6 shows a filters array composed of five filters (F1, . . . F5), for each overall gain value of the overall gain matrix. In view of the above, 5×25=125 filters are created for every look-up table.

Every filter (F1, . . . F5) of each filter array is a band-pass filter of "peaking" or bell type, centered on frequencies (Fr) that can typically vary from 120 to 600 Hz. The frequencies can have a different value, which must be tuned vehicle by vehicle. In addition to its center-band frequency, every filter is also defined by its Figure of Merit (Q) and by a gain value (g). The frequencies (Fr) and the Figures of Merit (Q) of the filters are preset (i.e. set during Tuning).

Also the selection of the gain values (g) of the filters is made during the acoustic turning of the vehicle, together with or immediately after tuning the overall gain matrix. Such additional tuning is necessary if you want to change the frequency contents of the signal (not only the level or gain) according to the RPM and TORQUE signal for certain RDNA values. The sound obtained from this additional tuning must be successively assessed and agreed with the car manufacturer, being submitted to successive tuning stages. For this reason a specific Tuning software is provided, which runs on an ordinary PC and is provided with a Graphic User Interface (GUI) that is easy to use. The PC is connected to the internal amplifier (4) by means of an RS232 serial port and the tuning software acts in real time on the DSP (2), applying the filters parameters in order to assess them acoustically. In such a case, when intermediate RPM and Torque values are detected with respect to the RPM and Torque values that are comprised in the overall gain values, a linear interpolation or an interpolation with non-linear spline function can be applied to obtain intermediate gain values (g) of the filters. Linear interpolation is preferred because it is the simplest and easiest form of interpolation in terms of calculations for the DSP. Obviously, a more complex interpolation may be used.

Figure 5:
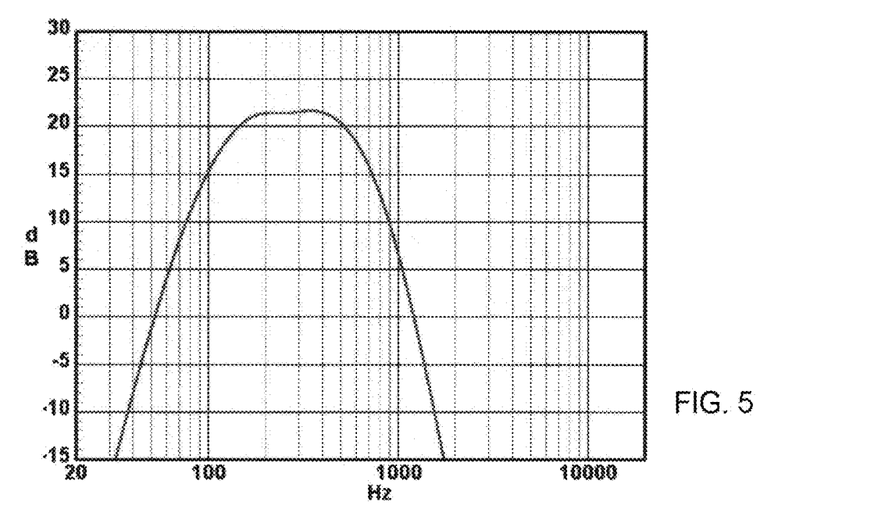
FIG. 5 is a diagram showing the transfer function 5 of the shaker of FIG. 2.

As shown in FIG. 5, the vibration sensor (1) has a precise transfer function with band centered in a frequency from approximately 20 to 1200 Hz. For example, the filters array (21) allows for emphasizing the components of the electrical signal (A) coming from the vibration sensor (1) in the high frequency part of the signal.

Then the electrical signal (A) passes in the overall gain block (20) wherein an overall gain is applied and then the electrical signal passes in the filters array (F1, . . . F5) selected according to the overall gain. The filters (F1, . . . F5) of the filters array filter the electrical signal (A) in certain frequencies comprised between 100 and 600 Hz and apply certain gains (g) of the filters to the electrical signal according to the RPM and Torque values detected by the CAN interface (5).

It must be considered that the DSP (2) can comprise only the overall gain block (20) or only the filter array (21).

Equivalent variations and modifications within the reach of an expert of the field can be made to the embodiments of the present invention while still falling within the invention scope.

We claim:

1. A sound enhancement system for an engine of a vehicle, the vehicle having a compartment for a driver and a passenger, the engine having a casing, the sound enhancement system comprising:
    a sound sensor that senses a sound of the engine and generates an electrical signal indicative of the sensed sound,
    a signal processor connected to said sound sensor so as to process the electrical signal to generate an output audio sound; and
    a speaker adapted to be disposed in the vehicle compartment, wherein said speaker is connected to said signal processor so as to receive the output audio sound and to generate an enhancement sound relative to the sound of the engine, wherein said sound sensor is a vibration sensor adapted to be disposed on the casing of the engine to detect vibrations of the engine casing that generate the sound of the engine and wherein the electrical signal is a vibration signal of the engine casing, and wherein said vibration sensor is a shaker or an exciter-type mechanical electrical transducer that has a fixed part firmly coupled to the engine casing and a mobile part that moves with respect to the fixed part when the engine casing has a vibration alteration so that the vibration sensor can detect a vibration speed of the engine casing, said vibration sensor acting as an accelerometer integrator or a velocimeter.

2. The sound enhancement system of claim 1, wherein said vibration sensor comprises a centering element acting as an elastic suspension, said centering element comprising an external ring connected to the said mobile part, an internal ring connected to said fixed part and a plurality of elastic spokes connecting said external ring with said internal ring.

3. The sound enhancement system of claim 1, comprising a CAN (Controller Area Network) interface adapted to be connected to a CAN-bus of the vehicle and connected to said signal processor, said CAN interface being configured to detect engine revolution and torque values and to send the values to said signal processor such that said signal processor uses the values to control a gain of the output audio signal.

4. The sound enhancement system of claim 3, wherein said signal processor comprises an array of dynamic filters connected to said vibration sensor and to said CAN interface, each filter of said array of dynamic filters having a preset frequency and a variable gain according to the engine revolution and torque values detected by said CAN interface.

5. The sound enhancement system of claim 3, wherein said signal processor comprises an overall gain block connected to said vibration sensor and to said CAN interface, said overall gain block being configured to apply an overall gain to the electrical signal detected by said vibration sensor according to the engine revolution and torque values detected by said CAN interface.

6. The sound enhancement system of claim 5, wherein said signal processor comprises an array of dynamic filters connected to said overall gain block and to said CAN interface, said array of dynamic filters comprising a plurality of filter arrays, wherein each filter array of said plurality of filter arrays is associated with a specific overall gain of said overall gain block, each filter having a preset fixed frequency and a variable gain according to the engine revolution and torque values detected by said CAN interface.

7. The sound enhancement system of claim 5, wherein said CAN interface is configured to detect from said CAN-bus a vehicle attitude value set by the driver from at least two vehicle attitude values, wherein said overall gain block contains a number of three-dimensional look-up tables equal to a number of vehicle attitudes that are set by the driver, wherein each three-dimensional look-up table has engine revolution values as an X axis, torque values as a Y axis and overall gain values as a Z axis.

8. The sound enhancement system of claim 1, wherein said signal processor comprises a mixer that mixes the electrical signal detected by said vibration sensor with an audio signal coming from an audio multi-channel power amplifier of the vehicle.

9. The sound enhancement system of claim 8, wherein said signal processor comprises a gain adjustment block connected to said mixer to set a gain of said audio signal from the audio multi-channel power amplifier.

10. The sound enhancement system of claim 1, wherein the vehicle has an audio system with a multichannel power amplifier connected to a plurality of speakers disposed in the vehicle compartment, wherein said speaker emitting the engine sound enhancement is a central speaker of said vehicle audio system.

* * * * *